Nov. 11, 1930. M. BRANDT 1,781,314
WATER PURIFICATION
Filed March 29, 1926 3 Sheets-Sheet 1

Inventor
Millard Brandt
By

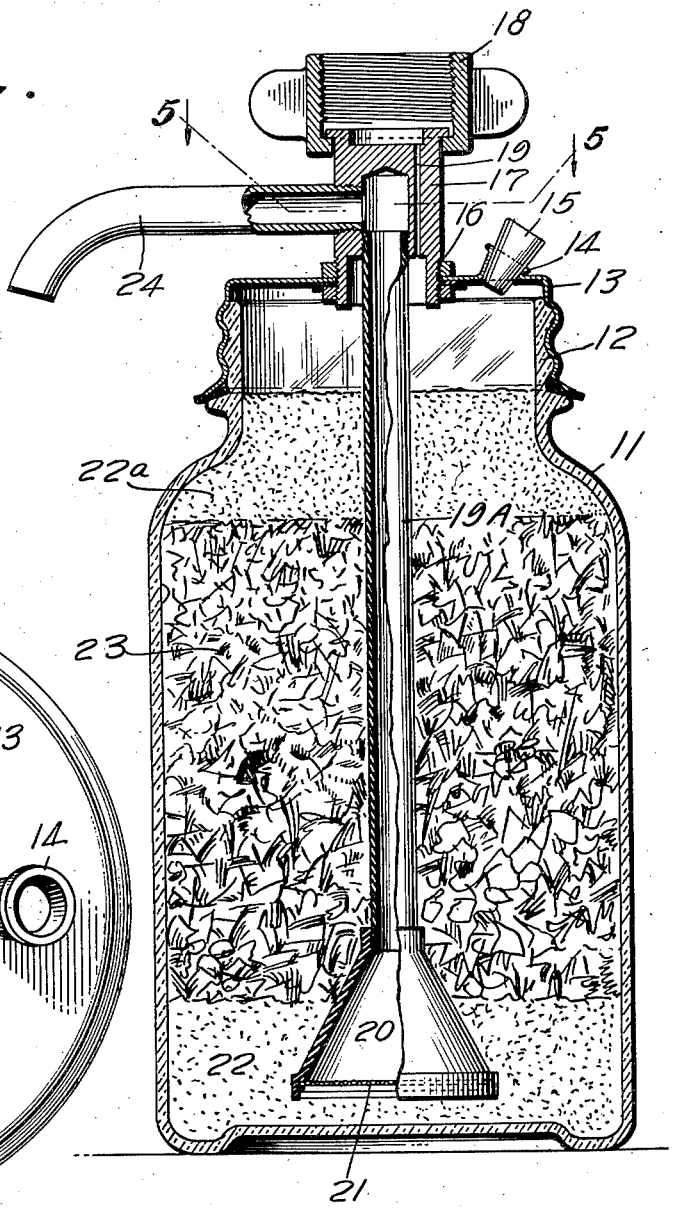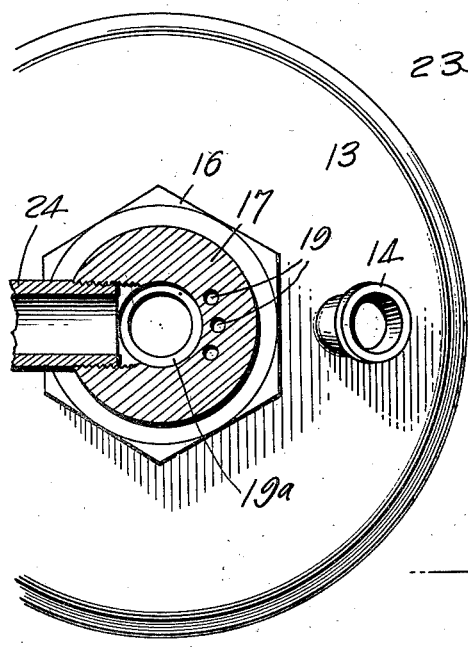

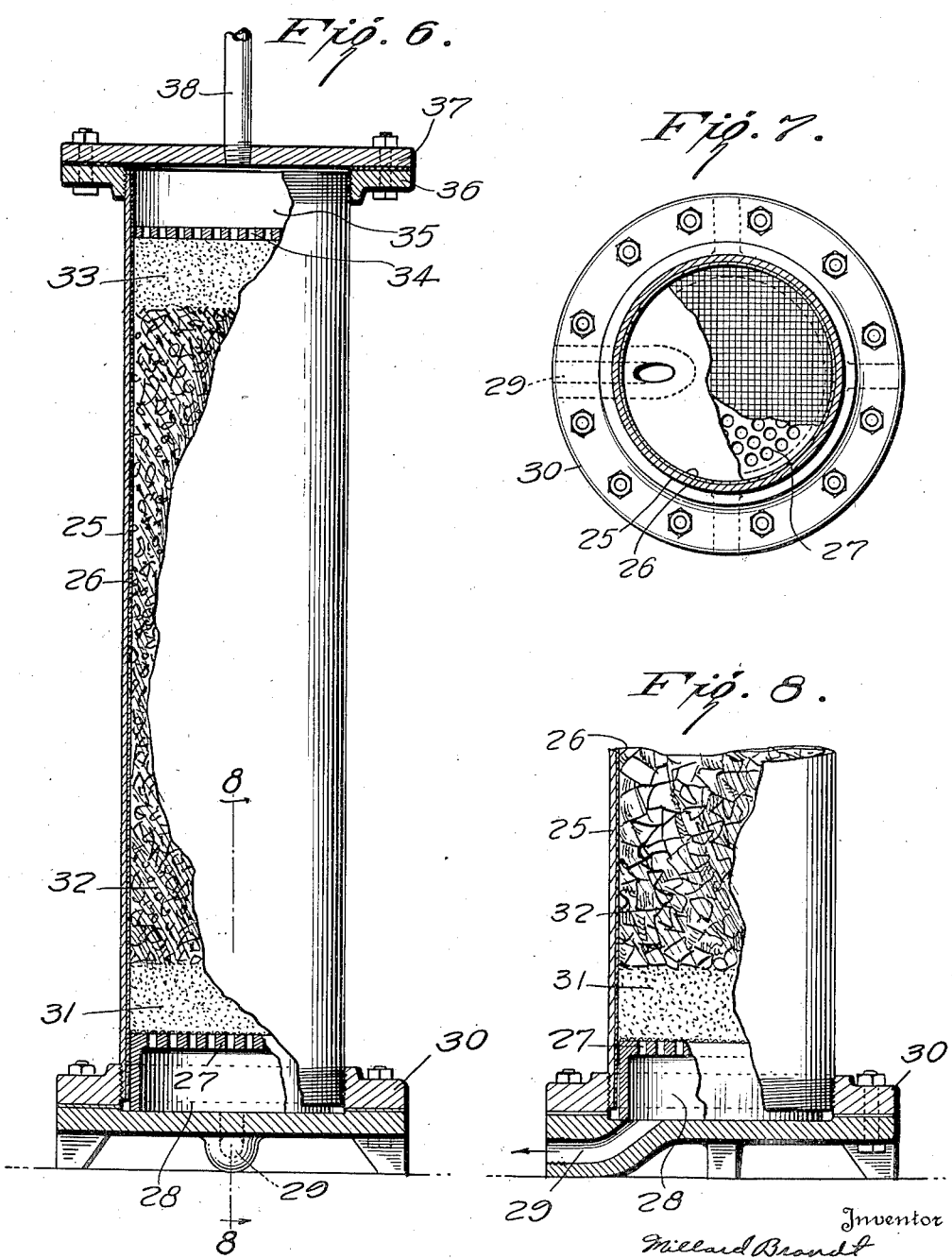

Patented Nov. 11, 1930

1,781,314

UNITED STATES PATENT OFFICE

MILLARD BRANDT, OF TAMAQUA, PENNSYLVANIA, ASSIGNOR TO DARCO CORPORATION, OF WILMINGTON, DELAWARE, A CORPORATION OF DELAWARE

WATER PURIFICATION

REISSUED

Application filed March 29, 1926. Serial No. 98,385.

My invention relates to the art of purifying water, and it has particular reference to a method of and apparatus for purifying water with the aid of activated carbon.

Water purification, or the removal from natural waters of various impurities harmful to health, is now recognized as a civic necessity. In many instances, purification is effected by filtering the water through a bed of sand, by treating with chlorine, or like methods. It has also been proposed to purify water by means of carbonaceous material, but such proposals, while particularly applicable to small installations, have not been received with favor for larger, due to the mechanical difficulties encountered.

It is the object of this invention to provide means for the purification of water, wherein carbonaceous material may be used without the attendant disadvantages heretofore experienced and with additional advantages.

This object is realized by filtering water through a bed of activated carbon, which, it has been found by exhaustive experiments and observations, is highly effective in removing color, odor, taste, bacteria, and other impurities from water which render it unfit, in its natural condition, for domestic or industrial use. It is much more effective for this purpose than any other form of carbon. Such carbon, however, being a good conductor of electricity and electro-negative to most metals, in the presence of water forms a galvanic couple with metals, developing electric currents with cause rapid corrosion of metals and untimely failure of the installation. To overcome this difficulty, I maintain the carbon out of contact with any metals, spacing the filtering bed of activated carbon from accessory metal elements by means of something other than metal. This removes the major difficulty which has heretofore prevented the exploitation of any filters of this character.

I find it best to use as a purifying material firm coarse grains of activated carbon about 85 per cent of which will be retained on a 100 mesh sieve, Bureau of Standards specifications. Other grain sizes may be employed, if desired, but the specification given provides a filtering material through which water may rapidly percolate, while, however, contacting for a sufficient time and with sufficient contact area to insure the proper removal of impurities. As stated, this bed of carbon in the present invention does not contact with any accessory metal elements to cause galvanic actions. To relieve the purifying material from extra duty, I usually provide beds of filtering sand at opposite sides, which not only remove some dirt, color, etc., but also facilitate the spacing of the activated carbon in practical installations.

As compared with other forms of amorphous carbon, activated carbon is a good conductor for the electric current. Most commercial decolorizing carbons are excellent conductors. Those coarse grades of activated carbon which I have so far prepared for the present purpose share this property. Being conductors and being charged with adsorbed oxygen from the air they are apt to cause corrosion of iron and steel containers in a most condition. Used in the ordinary types of filtering apparatus of iron or steel they tend to set up a galvanic couple. This is not only injurious to the container but has the further disadvantage that the special activities of the carbon for the present purpose are lessened or disappear—this being possibly because of the removal of the adsorbed oxygen. With carbon in conductive contact with metal walls of a container, the metal corrodes and the hydrogen evolved in corrosion acts as a depolarizer keping the carbon stripped of adsorbed oxygen.

With all the coarse grained carbons with which I have had experience, it is necessary that the pervious bed of carbon be maintained isolated from any conductor with which it can form a galvanic couple. Where iron and steel or other metallic containers are used, they must be interiorly insulated with a waterproof, permanent dielectric, such as rubber, bakelite, or a good grade of enamel. The whole container may be made of these insulating bodies. The main point is that for the present purpose the activated carbon of grades with which I am familiar and which I here use must be given no opportunity to produce a galvanic couple whereby metal can be corroded and the carbon itself stripped of adsorbed oxygen.

In the accompanying drawing, illustrating typical installations of filtering apparatus incorporating the principles of my invention, Figure 1 shows in elevation what may be termed a bucket type filter;

Figure 4 is a vertical section of what may be termed a Mason jar type of filter;

Figure 5 is a detail top plan view;

Figure 6 is a vertical section of a filter of metal on a larger scale;

Figure 7 is a top plan view of the same; and

Figure 8 is a broken away detail view of the lower portion of the filter of Figure 6 taken at right angles to the view in Figure 6.

Figure 1:
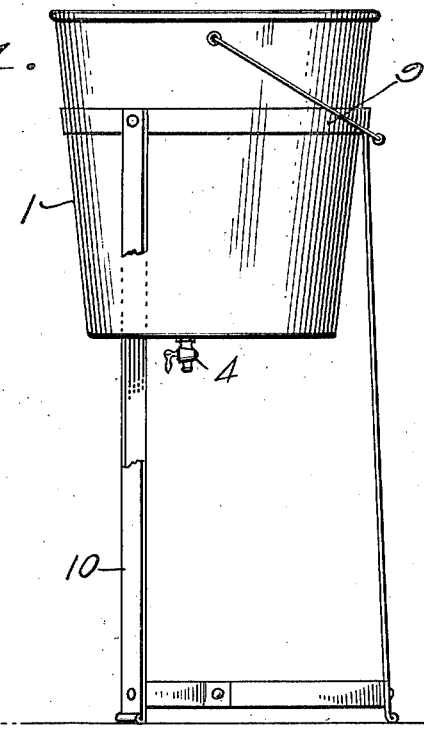
Figure 3:
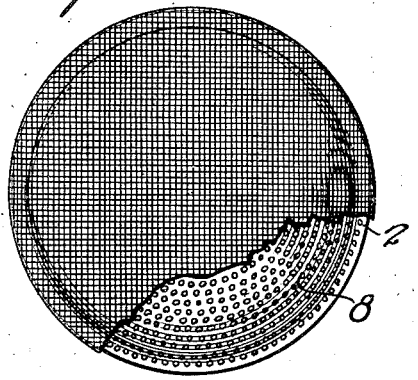
Figure 3 is a broken away view of the bottom of the filter looking up.
Figure 2:
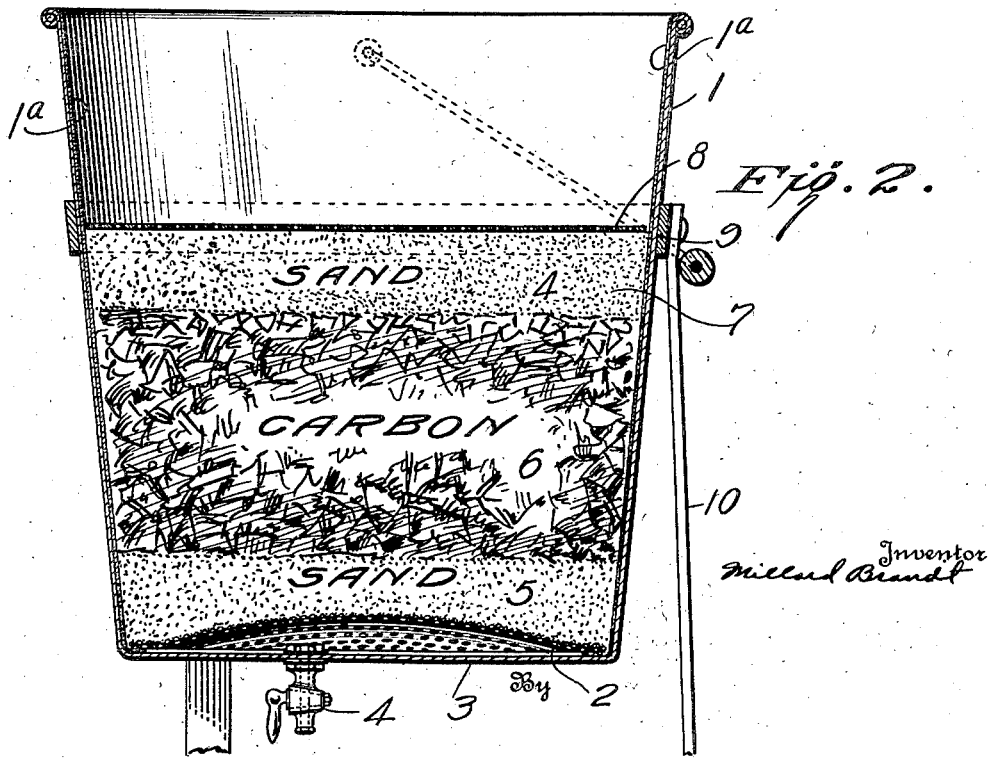
Figure 2 is a vertical section of the filter proper.

In the construction illustrated in Figures 1, 2 and 3 the holding element is a bucket or pail-like structure 1 which may be made of either enameled iron or of any material not forming a galvanic couple with the carbon, or may be any ordinary type of bucket having a lining 1ª of bakelite, rubber, enamel or other insulating material. Ordinary enameled iron is satisfactory. As shown the container is of open type structure. At its base it has a perforated diaphragm or false bottom 2 and the bottom 3 is provided with a valved outlet 4 as illustrated. Within the container is a bottom layer 5 of sand, a layer 6 of course grained activated carbon and an upper layer 7 of sand. Above this upper sand layer may be a perforated diaphragm 8 of any convenient material. As it is not in contact with the carbon its nature is immaterial for the present purposes. As shown the structure is provided with a bail 9 and a supporting frame work 10.

In Figure 4 the container is shown as a glass jar 11 of an ordinary type, that known as a Mason jar, or the container may advantageously be of hard rubber, provided with a mouth threaded at 12 on which screws a cap 13 which may be of metal. The cap is usually provided with a perforation 14 closed by rubber stopper 15. This cap is threaded at 16 to a special fitting 17 carried by wing nut 18 adapted to be screwed to a faucet or the like. Through the fitting 17 passes inlet passage 19 carrying water to the jar. The fitting also carries depending pipe 19A of rubber or other insulating material passing downward to a point near the bottom of the jar. On this pipe is screwed a conical member 20 carrying a screen member 21 at its base. This screen member may be of metal. Around the coned member is a layer of sand or gravel 22. Above the sand bed is a bed 23 of activated carbon. Above this is another layer of sand 22ª. This carbon is in contact only with the glass walls of the jar. Water filters downward through the layer of sand 22ª, passing through the mass of carbon 23 and through sand or gravel 22 and thence upward through the pipe 19A. At its top the fitting 17 is provided with lateral discharge conduit 24.

The foregoing figures are of small apparatus intended for field and household use. In Figure 6 is illustrated a filter apparatus of larger type. As shown in Figure 6, it comprises a cylindrical member 25 of iron, steel or other convenient material interiorly lined with a layer 26 of bakelite, hard rubber or other material withstanding long contact with water and of insulating properties. Within this casing is a bottom perforated supporting member 27 and below it water chamber 28 and outlet 29. As shown, the cylindrical member 25 screws into a bottom casting 30 which serves as a support for the whole apparatus. Above the perforated member 27 is a layer of sand or gravel 31 above which again is a comparatively deep layer of activated carbon 32. Above this is another layer of sand 33, a grating 34 and a tight water chamber 35. The apparatus is flanged at 36 and provided with cover 37 through which passes water inlet 38.

From the foregoing description, it will be observed that I have provided means for purifying water by means of activated carbon, which are susceptible of wide application, and free from the mechanical difficulties of corrosion, slowness of operation, necessity of stirring, etc., that heretofore have restricted the application of such carbon to filtering purposes. It is intended that the scope of the invention should be determined from the appended claim, and not from the specific examples given by way of illustration.

What I claim is:—

In the purification of water by activated carbon in a metal container, the improvement which comprises disposing the carbon in a pervious bed of highly activated, firm, electrically-conductive, oxygen-absorbing particles in said container and electrically insulating said container from said bed in such a way as to prevent the carbon from forming galvanic couples with oxidizable metals when the apparatus is in use and thus to make oxygen adsorbed by the carbon available for reaction with impurities in the water.

In testimony whereof, I have hereunto affixed my signature.

MILLARD BRANDT.